(12) United States Patent
Han et al.

(10) Patent No.: US 10,634,850 B2
(45) Date of Patent: Apr. 28, 2020

(54) LARGE-CAPACITY OPTICAL FIBER SWITCH DEVICE AND THE PROGRAM-CONTROLLED EXCHANGE METHOD

(71) Applicants: Dejiao Xu, Beijing (CN); TIAN JIN SHENG YUN NEW MATERIAL TECHNOLOGY CO., LTD, Tianjin (CN); Guangshu Liu, Tianjin (CN); Jiliang Han, Tianjin (CN)

(72) Inventors: Jiliang Han, Tianjin (CN); Guangshu Liu, Tianjin (CN); Dejiao Xu, Beijing (CN)

(73) Assignees: Dejiao Xu, Beijing (CN); TIAN JIN SHENG YUN NEW MATERIAL TECHNOLOGY CO. LTD, Tianjin (CN); Guangshu Liu, Tianjin (CN); Jiliang Han, Tianjin (CN)

( * ) Notice: Subject to any disclaimer, the term of this patent is extended or adjusted under 35 U.S.C. 154(b) by 0 days.

(21) Appl. No.: 15/771,401

(22) PCT Filed: Apr. 24, 2017

(86) PCT No.: PCT/CN2017/000316
§ 371 (c)(1),
(2) Date: Apr. 26, 2018

(87) PCT Pub. No.: WO2017/193608
PCT Pub. Date: Nov. 16, 2017

(65) Prior Publication Data
US 2018/0341066 A1 Nov. 29, 2018

(30) Foreign Application Priority Data
May 10, 2016 (CN) .......................... 2016 1 0306016

(51) Int. Cl.
*G02B 6/35* (2006.01)

(52) U.S. Cl.
CPC ............ *G02B 6/3516* (2013.01); *G02B 6/35* (2013.01); *G02B 6/3546* (2013.01); *G02B 6/3584* (2013.01); *G02B 6/3588* (2013.01)

(58) Field of Classification Search
CPC ... G02B 6/3516; G02B 6/3584; G02B 6/3546
See application file for complete search history.

(56) References Cited

U.S. PATENT DOCUMENTS

2015/0293308 A1* 10/2015 Blanche ................ G02B 26/06
385/16

FOREIGN PATENT DOCUMENTS

| CN | 1575428 | 2/2005 |
|---|---|---|
| CN | 1672075 | 9/2005 |

(Continued)

OTHER PUBLICATIONS

"International Search Report (Form PCT/ISA/210)", dated Aug. 3, 2017, with English translation thereof, pp. 1-4.

*Primary Examiner* — John Bedtelyon
(74) *Attorney, Agent, or Firm* — JCIPRNET

(57) ABSTRACT

An optical switch for optical fiber large-capacity stored program control exchanges. Optical transmission among optical fibers is performed through the reflection of lasers by a lens part of DMD chips. The lens part of the DMD chips consists of at least two single lenses or at least two lens basic units arranged in an one-dimensional array. The lens basic units are formed by arranging a number of single lenses in an n×n matrix, wherein 2≤n≤10. The one-dimensional array is arranged in such a direction that lasers do not interfere with each other after reflection. The area of the single lenses or that of the lens basic units is no less than the cross-sectional area of a single optical fiber.

9 Claims, 4 Drawing Sheets

(56) References Cited

FOREIGN PATENT DOCUMENTS

| CN | 104297858 | 1/2015 |
| CN | 104345394 | 2/2015 |
| CN | 104345395 | 2/2015 |
| CN | 105068190 | 11/2015 |
| CN | 105891965 | 8/2016 |

* cited by examiner

LARGE-CAPACITY OPTICAL FIBER SWITCH DEVICE AND THE PROGRAM-CONTROLLED EXCHANGE METHOD

CROSS-REFERENCE TO RELATED APPLICATION

This application is a 371 application of the international PCT application serial no. PCT/CN2017/000316, filed on Apr. 24, 2017, which claims the priority benefit of China application no. 201610306016.4, filed on May 10, 2016. The entirety of each of the abovementioned patent applications is hereby incorporated by reference herein and made a part of this specification.

BACKGROUND OF THE INVENTION

Technical Field

The present invention relates to the optical switch device in the laser communication field, which is the optical switch of the large-capacity optical fiber program-controlled exchange and router designed based on the one-dimensional array and of over 10-thousand-line to 10-million-line order.

Description of Related Art

Now, optical fibers are widely used to replace conventional copper wires for long-distance information transmission (images, data and voice) as a communication means for transferring signals in the communication field. With a wide frequency band (theoretically up to 30 T), ten kilometers to one hundred kilometers of length without relay support, a long life, low cost, a light weight, not affected by electromagnetic fields and electromagnetic radiation, strong anti-interference, neutral, safety in use and a wide operation environmental temperature range, optical fibers are widely used in large quantities at home and abroad.

The electrical signals of program-controlled exchanges (or routers) are switched on using the gate circuit of logic devices, so the switching of large-capacity electronic exchanges (routers) are easily realized. In optical communication, lasers are transmitted through optical fibers which do not have any logic device. Ten thousand optical fibers form the foundation of the optical fiber program-controlled exchange and small-capacity optical fiber switches are used for splicing, so this does not match the ten-thousand-line electronic exchanges which are easily realized.

In the long-distance optical communication, ten-thousand-line electronic program-controlled exchanges are used as the main body to carry out optical-electrical-optical-electrical conversion times. After lasers go through electronic devices, the band width is compressed and the performance is reduced. When a cable is broken, the number of optical fibers switched is less than 5 and the communication information is interrupted. Since optical fibers do not have logic optical paths, small-capacity optical switches do not match ten-thousand-line electronic switches in capacity. MEMS-chip optical fiber switches are widely believed to have a good chance of success in the communication industry, but they have the structure of 4×4 and 1×n, equivalent to four lines or about ten lines. Those skilled in the fields at home and abroad researches and explores optical switches with other principles, such as mechanical optical switches, moveable mirror-type optical fiber switches, electro-optical switches, directional coupling optical switches, M-Z type interferometer optical switches, liquid crystal optical switches, magneto-optic effect optical switches and acousto-optic switches. The input of these switches is one and the output is two, equivalent to two lines, so they are not at the same order of magnitude as ten-thousand-line electronic program-controlled exchanges.

The mirror of the MEMS chip optical fiber switch which is widely believed to have a good chance of success in the communication industry has a structure of 4×4 and 1×n, so the extension to ten-thousand-line systems is complicated. The MEMS chip mirror has only one reflection angle and the laser channel of other lines will be interfered with after reflection by the mirror in the chip, so ten-thousand-line electronic exchange switches cannot be put into full play. Besides, the communication need cannot be met with the increase of communication information and addresses by geometric series.

In 2016, the Chinese Government raised 100 national major projects of the 13th Five-Year Plan among which the fortieth project is a high-speed optical fiber communication system. In the achievement of this goal, large-capacity optical fiber switches may be the bottle neck. Those skilled in this field cannot make them, and after the lasers of optical fibers are converted through circuits, the band width is compressed.

Optical fibers are often broken accidentally, randomly and unexpectedly. In the prior art, the optical communication mode with the electronic program-controlled exchange as the main body has continuous optical-electrical and electrical-optical conversion times (n is a natural number) and the system is complicated, so when cables and fibers are broken, information transmission in the communication is interrupted.

The patent of the U.S. Intel Corporation (ZL02821272.X and ZL02821138.3) provided the MEMS technical solution with the input of 1000 lines and the output of 1000 lines. This invention cannot be freely extended to the input of over 1000 lines and the output of over 5000 lines. It disclosed a technical solution of 1000-line MEMS switch arrays, but the patent did not provide the specific technical solution of devices. The input/output has 1000 ports. The characteristic of the MEMS chip is that there is only one optical axis in the X direction, so when one reflective lens reflects, the mirror blocks the other 999 mirrors in front and behind. When there are 1000 input ports, there can be only 1000 output ports. So is the Y axis. 1000 mirrors on the X axis of the MEMS chip multiplied by 1000 mirrors on the Y axis makes 1000000 matrix mirrors which allows a low-efficiency 1000-line optical switch to be realized. 1000000 matrix mirrors are still not sufficient for the realization of large-capacity optical fiber switches required by products in the international communication field and having an extension function of input=n and output >n+5 (n≥1, a natural number).

To realize large-capacity optical switches, the following functions are needed:

1) Increasing the reflection angles of MEMS chip optical switch mirrors, i.e. extending from 1 to 3 or more, to solve the laser interference problem and the extension problem of optical switches.

2) Increasing the MEMS chip optical switches, extends from small-sized mirrors of 4×4 and 5×5 as one basic unit (1 line) to large-sized single lens mirrors (tens of lines~ten thousands of lines or more), and increase matrix mirrors and array mirrors.

3) Using tens of lines~ten thousand of lines of single-lens or multi-lens optical switches, and longitudinal extension by geometric series, to reach program-controlled of the optical fiber output at an order of magnitude of ten thousand lines.

4) Using tens of lines~ten thousand lines of single-lens or multi-lens tens switches and repeating connection of output and input on these devices to solve the transverse link extension of program control.

5) Combining 3) with 4) to form ten-thousand-line matrices for program-controlled exchange.

6) Developing one-thousand-line or ten-thousand-line large-sized array or matrix mirror optical switches for communication.

7) For the one-thousand-line or ten-thousand-line optical switches used for communication, the reflection angle of the mirrors is in the longitudinal direction, the transverse direction is an array or matrix arrangement; the contrary is the contrary. The reflection direction of individual mirrors in the array does not interfere with each other and is arranged in parallel, and array mirrors are arranged to point in other directions; so do 4×4 and 5×5 matrix mirrors as one basic unit.

8) The array mode is adopted for mirrors according to 7): the size of one mirror corresponds to that of one optical fiber, and the mirror size is increased to 50 μm×50 μm, 62.5 μm×62.5 μm or larger; in matrix mode: small-sized mirrors such as 4×4 and 5×5 are used, and the size of a number of mirrors corresponds to the diameter of the optical fiber or the size of mirrors are increased. The size of each lens of small-sized mirrors is 14 μm×14 μm (or 16 μm×16 μm), and the diameter of single-mode optical fiber cores is 8 μm~10 μm, so they can directly correspond to each other. Multi-mode optical fiber cores have two diameters: 50 μm and 62.5 μm, and the size of individual lens now is 14 μm×14 μm (or 16 μm×16 μm), so matrix 4×4 and 5×5 mirrors or larger sizes are used to correspond them.

9) The reflection direction of mirrors in the matrix mode is the same as that in the array mode, i.e. all mirrors are arranged in parallel but they can be staggered, which brings the problem of optical fiber alignment while increasing the distance between adjacent mirrors in the matrix and reducing the laser interference.

The background technologies cannot meet the realistic need created by the amount of communication information and addresses increasing in geometric series. Large-capacity optical switches with optical fiber switching >5 are a technical concept and a technical solution which can meet the need created the amount of communication information and addresses increasing in geometric series.

Large-capacity optical switches with optical fiber switching >5 is a technical problem in the optical fiber communication field. At present, those skilled in the communication fields at home and abroad have no solution, not to mention technical solutions designed based on arrays. If optical fibers can reach the switching performance and capacity of electronic program-controlled exchanges (or routers), long-distance point-to-point communication without compression and optical/electrical switching in the last 1 kilometer can be realized. If so, the mode of the optical communication system in the world will be changed.

To sum up: there is a huge gap between the 4×4 and 1 xn MEMS chip widely believed to have a good chance of success in the communication fields at home and abroad and the need of the communication industry, so the functions above of the communication industry cannot be realized. Even the 1000-line MEMS patented technology of the U.S. Intel Corporation also has a limited path of evolution.

In the present invention, the DMD technology in the non-communication field is applied to the communication field, and to optical switches and optical fiber program-controlled exchanges. Those skilled in this field have ever thought of this, not to mention creative technical concepts and technical solutions of design; DMD digital image micro-mirror chips are different from DMD one-dimensional array chips according to the present invention in technical fields, technical problems to be solved, technical solutions and technical indicators. One DMD digital image micro-mirror chip has 800×600, 1024×768, 1920×1080, 4K, 8K mirrors in the prior art: for example, even if one DMD1920×1080 chip with over 2 million matrix mirrors is used in an optical switch for communication, useful ones are about hundreds of lines, and others are useless when the chip is used in multi-mode optical fibers; useful ones are just thousands of lines when it is used in single-mode optical fibers (no one has ever thought of making communication optical fiber switches).

BRIEF SUMMARY OF THE INVENTION

The aim of the present invention: to provide a large-capacity optical fiber switch device and the program-controlled exchange method which can overcome the shortcomings in the prior art. The switch device is a new large-capacity DMD array optical fiber switch or a large-capacity array optical fiber switch with DMD basic units. The input of a single lens is over tens of lines~ten million lines and the output reaches over a hundred lines~tens of millions of lines. Input/output program-controlled exchange optical fiber switches are realized through crossbar connection of multi-lens DMD optical fiber switches; when optical fibers (optical cables) are broken, optical switches can be quickly switched to other >5 optical fibers (cables).

The technical solution of the present invention: an optical switch for large-capacity optical fiber program-controlled exchanges, characterized in that it comprises an input optical fiber, DMD chips and output optical fibers, where the input optical fiber transmits lasers to the lens part of a DMD chip, a DMD chip control circuit controls the lenses to rotate through the hinge of the lenses after sending control signals, and the lenses reflect the rays to the corresponding output optical fibers; the lens part of the DMD chip consists of at least two single large-sized lenses or single small-sized lenses arranged in an array, or consists of at least two lens basic units arranged in an array, where a number of single small-sized lenses are arranged in the form of an n×n (2≤n≤10) matrix to form lens basic units; the single lenses or the lens basic units arranged in an array are arranged in such a direction that the lasers do not interfere with each other after reflection; both the address control signal of the single lenses arranged in an one-directional array and that of the lens basic units arranged in an one-directional array are an one-directional array; the single lenses in the lens matrix basic unit receives the same address control signal simultaneously and acts simultaneously.

The lens part of the DMD chips can form at least 3 optical reflection angles, i.e. the input of each DMD chip mirror has 1 angle and the output has at least 3 angles.

The DMD chips are arranged by an N-level longitudinal extension to form a DMD chip set consisting of at least 2 DMD chips, i.e. the input optical fiber transmits lasers to the first-level DMD chip, the rays are reflected from the first-level DMD chip to the next-level DMD chips corresponding to at least three output angles of the first-level DMD chip by rotating the lens part; in this way, the rays are reflected to the Nth DMD chips and finally reflected to the corresponding output optical fibers.

The DMD chips are arranged by transverse extension to form a DMD chip set consisting of at least 2 DMD chips, i.e. the input optical fiber transmits lasers to one of the DMD chips, the rays reflected by the DMD chip and at least one of at least 3 output angles are reflected to another DMD chip; among the rays reflected by the DMD chip, the rays reflected at least one angle are reflected to another DMD chip, and the rest of the rays are reflected to the corresponding output optical fibers, thus the incident rays are transversely extended.

After the DMD chip set formed by the N-level longitudinal extension and the DMD chip set formed by transverse extension are butt-joined, they are combined with other devices to form a program-controlled crossbar optical fiber exchange.

The port of the DMD chips is a bi-directional port. Lasers are connected to the DMD chip port through optical fibers or chip ports are butt-joined with each other or connected in a mixed way or randomly connected according to the need of program-controlled exchange control.

The distances between single lenses of the DMD chips can be randomly combined according to conventional settings. They can be set as required according to the diameter of optical fibers.

The 50 μm×50 μm single large-sized lens of the DMD chips corresponds to a multi-mode input optical fiber with a diameter of 50 μm, or the 62.5 μm×62.5 μm single large-sized lens corresponds to a multi-mode input optical fiber with a diameter of 62.5 μm, or larger lenses correspond to a multi-mode input optical fiber with a diameter of 50 μm and 62.5 μm.

The 4 μm×14 μm or 16 μm×16 μm single small-sized lens of the DMD chips corresponds to a single-mode input optical fiber with a diameter of 8 μm~10 μm.

The 14 μm×14 μm or 16 μm×16 μm reflective lenses are arranged in the form of a n×n (2≤n≤10) matrix into lens basic units which act simultaneously and correspond to a multi-mode input optical fiber with a diameter of 50 μm or 62.5 μm.

Each of the 50 μm×50 μm or 62.5 μm×62.5 μm or other large-sized lenses or each of the 14 μm×14 μm or 16 μm×16μm or other small-sized lenses operates with one address and one semiconductor optical switch; or 14 μm×14 μm or 16 μm×16 μm or other small-sized lenses are arranged in the form of a n×n (2≤n≤10) matrix into a lens basic unit, and each unit operates with one address and one semiconductor optical switch, and acts as a whole.

The lenses of the DMD chips are rotated in such an angle that bi-directional incident rays are reflected.

When there is a fault in the optical fiber communication line, feedback signals are sent back, the address and the lens angles of the DMD chips are changed through a control circuit, thus changing output optical fiber ports.

When the optical fiber (cable) is broken, control signals act on the relevant mirrors of multiple DMD chips simultaneously and complete switching to other optical fibers (cables) >5; the time delay milliseconds of the relevant mirrors of the multi-DMD chip optical switch is controlled simultaneously through address signals.

The conventional multi-mode optical fiber cores being used now have two diameters: 50 μm and 62.5 μm, and the diameter of single-mode optical fiber cores is 8 μm~10 μm.

The one-dimensional array is an orderly arrangement in the one-dimensional space.

The optical switch for large-capacity optical fiber program-controlled exchanges is combined with the 1000-line MEMS technology of Intel Corporation to form an optical fiber program-controlled exchange; any one optical fiber output port (≥1) of the optical switch for large-capacity optical fiber program-controlled exchanges is butt-joined with any one optical fiber input port (≥1) for which the 1000-line MEMS technology of Intel Corporation is applied, where the MEMS output port is 1000 lines or 100 0~9 ports are used; the output port of the optical switch for large-capacity optical fiber program-controlled exchanges is butt-joined with the MEMS input port, and two chips and ports are lapped according to the needs of program-controlled exchange.

The operating principle and the operating process of the present invention are as below:

The DMD device is a semiconductor optical switch, where a single lens or a lens basic unit represents one address, and binary plane signals are adopted for the addressing of the storage unit of each single lens or lens basic unit; each lens on the DMD is tilted using static electricity, and the PWM (pulse width modulation) technology is applied to determine how long each lens is tilted in a certain direction. The rotation of micro-lenses is controlled by digital drive signals from CMOS RAM. Under normal conditions, the lenses tilt at an angle of 0 degree. When digital signals are written in the SRAM, static electricity activates address electrodes, lenses and yokes which makes the hinge mechanism to rotate; after receiving corresponding signals, the lenses tilt; the lasers needed are reflected by the different angles of the lenses (for example, −12 degrees, 0 degree, +10 degrees, +12 degrees or other appropriate degrees) and fall on the DMD after passing a grating, and the lasers are projected on the corresponding optical fibers or DMD chips by means of the lenses.

The technical effects and advantages of the present invention:

1. In the optical switch with DMD chips arranged by N-level longitudinal extension, lasers can reach over 10 thousand lines~10 million lines after optical fiber or chip ports are butt-joined with each other.

2. In the DMD chip optical switch, the one-optical-fiber-to-one-optical-fiber is adopted, and input ports and output ports are repeatedly butt-joined to realize a transverse-communication and small-capacity optical switch; single lenses are used to form an optical switch with over tens of lines~ten million lines, and the number of transverse DMD chips can be increased.

3. Multiple DMD chips are longitudinally arranged in geometric series, single-lens and multi-lens transverse input/output are repeatedly butt-joined, and then the input/output of longitudinal and transverse DMDs are connected to form a crossbar exchange program-controlled optical fiber switch exchange.

4. The output angles are extended by geometric series through the longitudinal and transverse extension of DMD chips, so that when optical fibers (cables) are broken, the optical switch is switched to other optical fibers (cables).

5. The lens part of each DMD chip may consists of mirrors of over tens of lines~10 million lines.

6. A new structure technology is adopted in the DMD chip, i.e. the arrangement of the lens part is changed from the two-dimensional matrix to the one-dimensional array, the size of each mirror of the lens part is increased to 50 μm×50 μm, 62.5 μm×62.5 μm or more to provide feedback control signals and realize an optical switch with tens of lines~ten thousand lines on a single lens.

7. The lens part of the DMD chips consists of existing 14 μm×14 μm or 16 μm×16 μm lenses arranged in the form of a n×n (2≤n≤10) matrix into matrix lens basic unit, which is equivalent to increasing the size of mirrors. Each lens basic unit corresponds to one optical fiber, and lens basic units form an optical switch with over tens of lines~ten million lines on an one-directional array.

8. The lens part of the DMD chips can have −12 degrees, 0 degree, +10 degrees, +12 degrees or other appropriate reflection degrees. More angles can be provided by controlling the watt level of the electrostatic field; different mirror reflection angles can also be provided by using multiple electrode fields, for example, if each mirror has 10 reflection angles, they can represent 0~9 numbers; these can be used as the technical solution of extension of optical communication switches.

9. The increasing of the distance between the lenses of the DMD chips is good for the butt-joining of optical fiber interfaces.

10. When there is a fault in an optical fiber communication line, feedback signals are sent back, the address and the angles of DMD mirrors are changed through a control circuit, thus changing optical fiber output ports; the control signals can be changed for multiple successive chips and simultaneous action can be made on multiple DMDs with the exchange time equivalent to that of one DMD, reducing the time delay of optical switches.

11. The large-capacity optical fiber switch and its application method according to the present invention can be used to realize the goal for communication systems of optical fiber communication without compression in the whole course and optical/electrical conversion in the last one kilometer, overturn the technologies in the present optical fiber communication field, make a contribution to the fortieth project "high-speed optical fiber communication systems" of 100 national major projects of the 13th Five-Year Plan of the People's Republic of China, and make a contribution to the knowledge shared by the whole human society.

12. In the present invention, the DMD imaging technology in the non-communication field is recreated and applied to the communication field to form a complete technical concept and a technical solution; the one-dimensional array technology is applied to butt-join the DMD and optical fibers and realize a large-capacity optical switch with the optical fiber switching >5; for example, if one DMD1920× 1080 chip with over 2 million matrix mirrors is changed into arrangement in the form of an array and used as a single-mode optical fiber switch, an over-6-million-line optical switch can be realized.

DETAILED DESCRIPTION OF THE INVENTION

Figure 1:
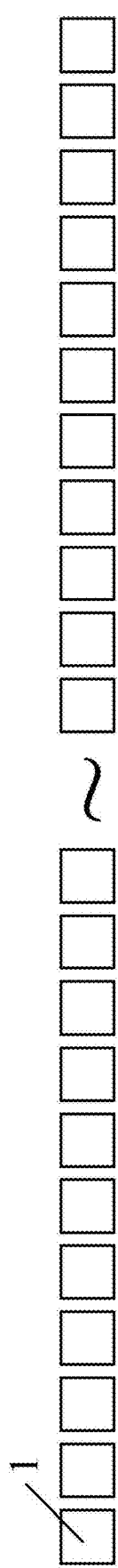
FIG. 1 illustrates the lens part of a DMD chip the single lenses of which are transversely (or longitudinally) arranged in the form of an array.
Figure 2:
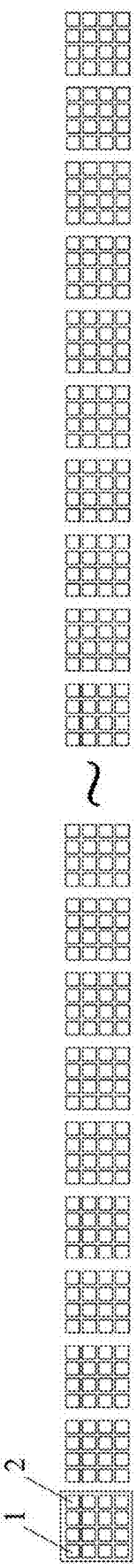
FIG. 2 illustrates the lens part of a DMD chip the single small-sized lenses of which are arranged into lens basic units in the form of an (4*4) matrix and the lens basic units are transversely (or longitudinally) arranged in the form of an array.
Figure 5:
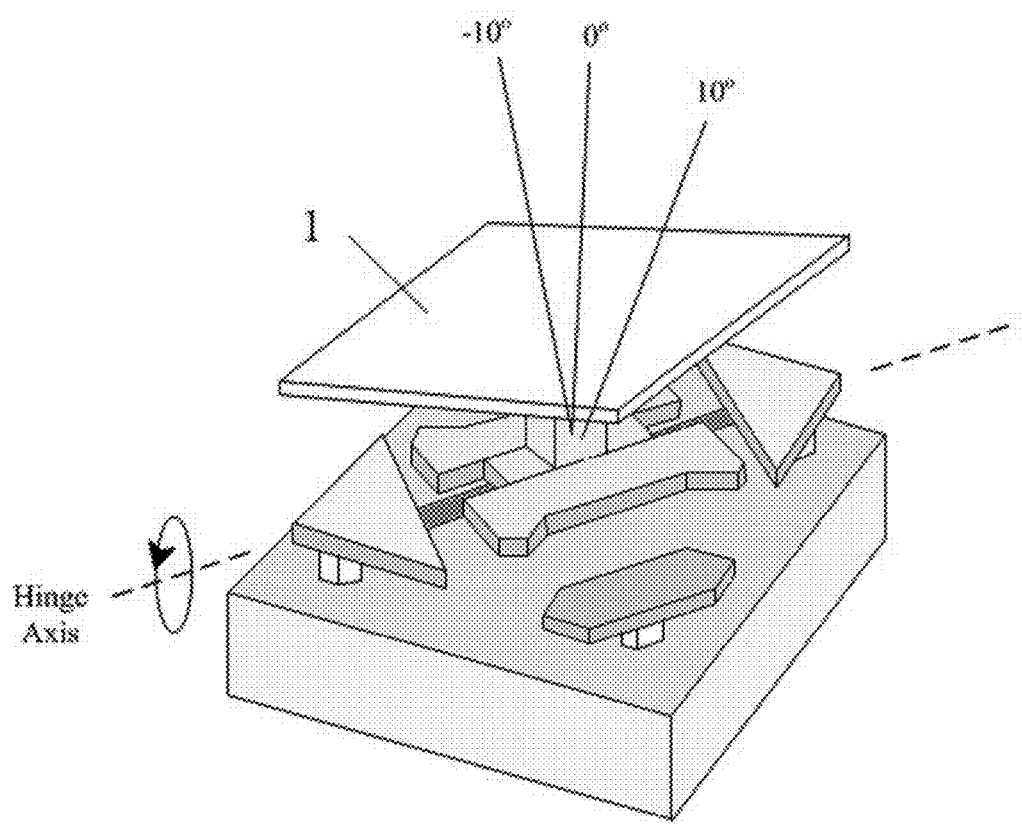
FIG. 5 illustrates the structure of a single-lens DMD lens. Wherein, 1 is a lens, and 2 is a lens basic unit.

Embodiment: an optical switch for large-capacity optical fiber program-controlled exchanges, characterized in that it comprises an input optical fiber, DMD chips and output optical fibers, where the input optical fiber transmits lasers to the lens part of a DMD chip, a DMD chip control circuit controls the lenses to rotate through the hinge of the lenses after sending control signals, and the lenses reflect the rays to the corresponding output optical fibers; the lens part of the DMD chip consists of single large-sized lenses 1 or single small-sized lenses 1 arranged in an array (FIG. 1 and FIG. 2), or consists of lens basic units arranged in an array (FIG. 2 and FIG. 5), wherein a number of single small-sized lenses 1 are arranged in the form of an n×n (2≤n≤10) matrix to form lens basic units; the single lenses 1 or the lens basic units 2 arranged in an array are arranged in such a direction that the lasers do not interfere with each other after reflection; both the address control signal of the single lenses 1 arranged in an one-directional array and that of the lens basic units 2 arranged in an one-directional array are an one-directional array; the single lenses 1 in the lens matrix basic unit 2 receive the same address control signal simultaneously and act simultaneously.

The 50 μm×50 μm single large-sized lens used in the lens part corresponds to a multi-mode input optical fiber with a diameter of 50 μm, or the 62.5 μm×62.5 μm single large-sized lens corresponds to a multi-mode input optical fiber with a diameter of 62.5 μm, or larger lenses correspond to a multi-mode input optical fiber with a diameter of 50 μm or 62.5 μm; each 50 μm×50 μm or 62.5 μm×62.5 μm lens operates with one address and one semiconductor optical switch;

or, Texas Instruments' 14 μm×14 μm or 16 μm×16 μm single small-sized lens used in the lens part corresponds to a single-mode input optical fiber with a diameter of 8 μm 10 μm; each 14 μm×14 μm or 16 μm×16 μm lens operates with one address and one semiconductor optical switch;

if 800×1 single lens, 1024×1 single lens, 1920×1 single lens, 4K×1 single lens, 8K×1 single lens, or 10000×1 single lens~over 10 million 10000×1 single lens are used to form the lens part of an optical switch, a ≥12000-line optical switch can be realized using only one DMD chip with 4000 reflective lenses arranged in an one-dimensional array.

Or, Texas Instruments' 14 μm×14 μm or 16 μm×16 μm reflective lenses are arranged in the form of a 4×4 or 5×5 matrix to form lens basic units of the lens part, and then 800×1 lens basic unit, 1024×1 lens basic unit, 1920×1 lens basic unit or 3840×1 lens basic unit are used to form a matrix optical switch. Each unit operates with one address and one semiconductor optical switch, acts as a whole, corresponds to a multi-mode input optical fiber with a diameter of 50 μm or 62.5 μm; a ≥12000-line optical switch can be realized using only one DMD chip with 16000~25000×reflective lenses arranged in the form of a 4×4 or 5×5 matrix.

The lenses of the DMD chips are rotated in such an angle that bi-directional incident rays are reflected, i.e. −12 degrees, 0 degree and +12 degrees. The lenses of the DMD chips can form 3 optical reflection angles, i.e. the input of each DMD chip mirror has 1 angle, and the output has at least 3 angles.

Figure 3:
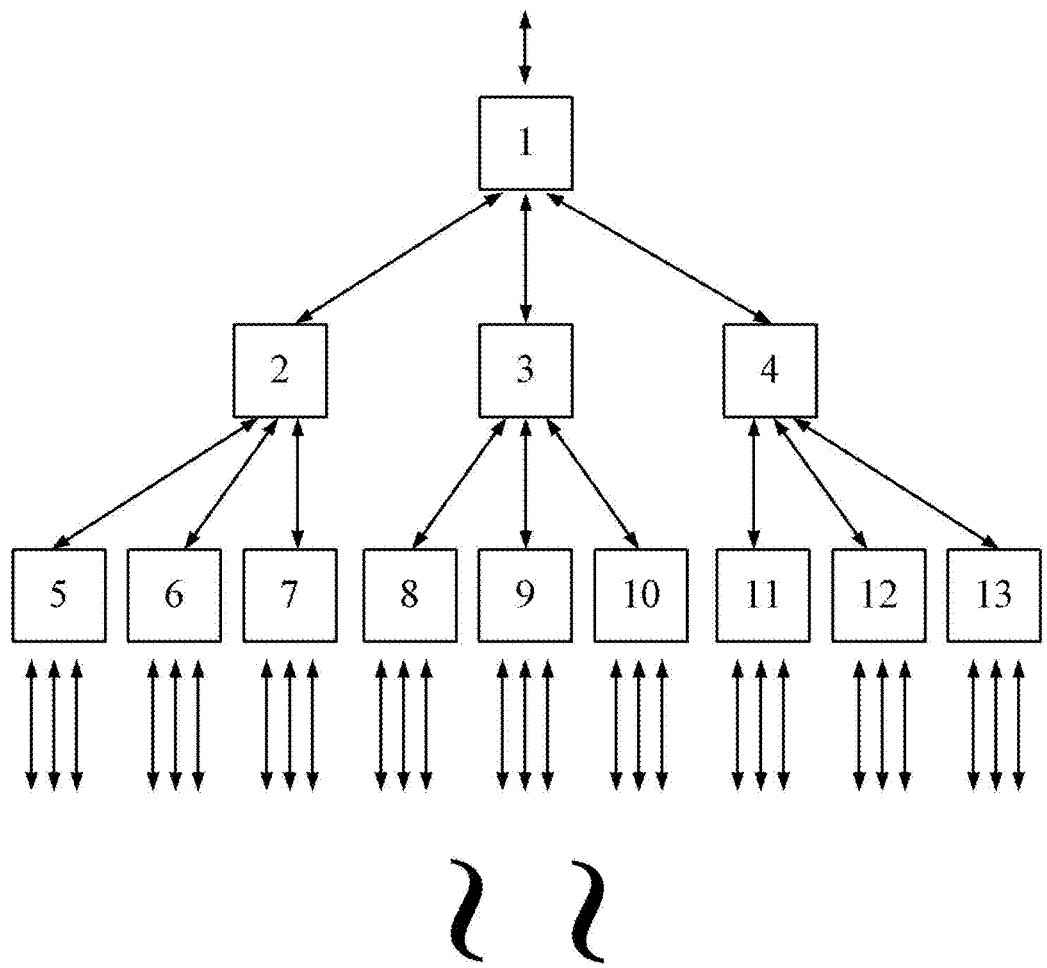
FIG. 3 illustrates the input/output link in the form of longitudinal geometric series of a (for example, 13 pieces) optical switch (each box represents one DMD or one mirror in the DMD)
Figure 4:
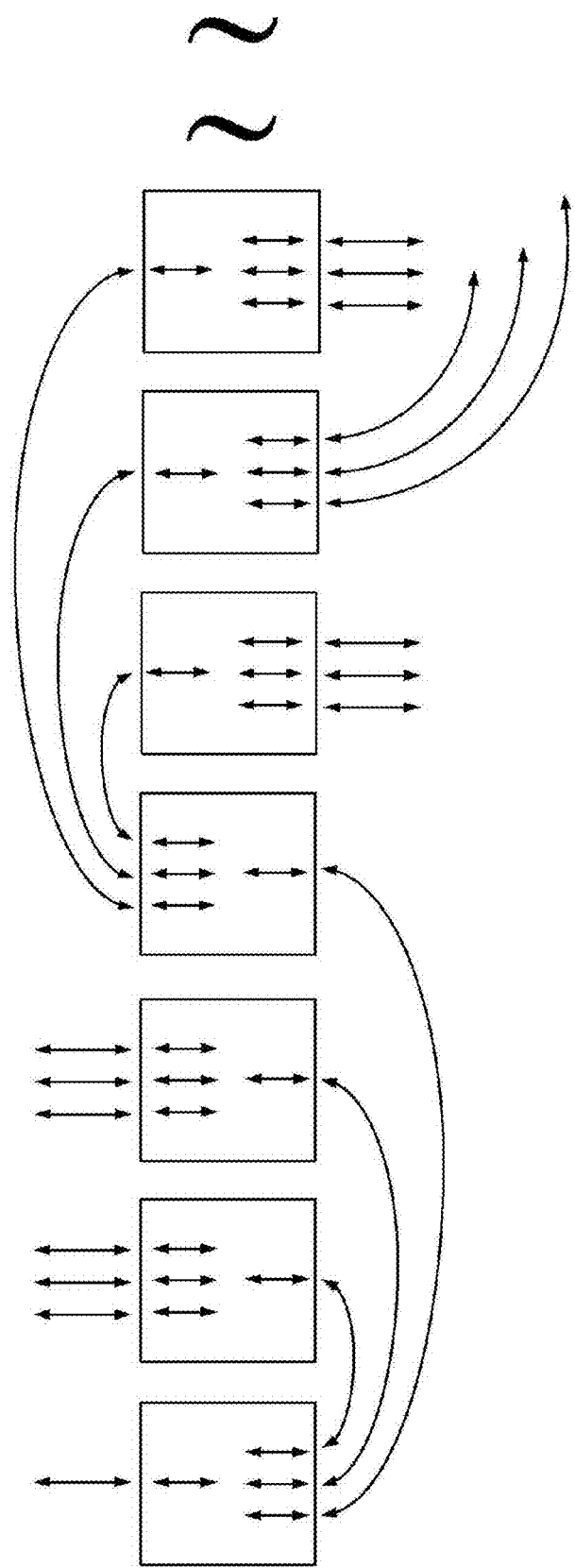
FIG. 4 illustrates the transverse input/output link form of a (for example, 7 pieces) optical switch (each box represents one DMD or one mirror in the DMD)

The DMD chips are arranged by 3-level longitudinal extension to form a DMD chip set consisting of 13 DMD chips, i.e. the input optical fiber transmits lasers to the first-level DMD chip, the rays are reflected from the first-level DMD chip to the next-level DMD chips corresponding to the 3 output angles of the first-level DMD chip by rotating the lens part; in this way, the rays are reflected to the Nth DMD chips and finally reflected to the corresponding output optical fibers; (see FIG. 3)

or, the DMD chips are arranged by transverse extension to form a DMD chip set consisting of 7 DMD chips, i.e. the input optical fiber transmits lasers to one of the DMD chips, the rays reflected by the DMD chip and at least one of at least 3 output angles are reflected to another DMD chip; among the rays reflected by the DMD chip, the rays reflected at least one angle are reflected to another DMD chip, and the rest are reflected to the corresponding output optical fibers, thus the incident rays are transversely extended; (see FIG. 4)

or, after the DMD chip set formed by N-level longitudinal extension and the DMD chip set formed by transverse extension are butt-joined, they are combined with other devices to form a program-controlled crossbar optical fiber exchange.

The port of the DMD chips is a bi-directional port. Lasers are connected to the DMD chip port through optical fibers, or chip ports are butt-joined with each other or connected in a mixed way, or randomly connected according to the need of program-controlled exchange control.

The distances between the single lenses of the DMD chips can be randomly combined according to conventional settings. They can be set as required according to the diameter of optical fibers.

When an optical fiber communication line has a fault, feedback signals are sent back, the address and the lens angles of the DMD chips are changed through a control circuit, thus changing output optical fiber ports.

When the optical fiber (cable) is broken, control signals act on the relevant mirrors of multiple DMD chips simultaneously and complete switching to other optical fibers (cables) >5; the time delay milliseconds of the relevant mirrors of the multi-DMD chip optical switch is controlled simultaneously through address signals.

Conventional multi-mode optical fiber cores used now have two diameters: 50 µm and 62.5 µm, and the diameter of single-mode optical fiber cores is 8 µm~10 µm.

The one-dimensional array is an orderly arrangement in the one-dimensional space.

The optical switch for large-capacity optical fiber program-controlled exchanges is combined with the 1000-line MEMS technology of Intel Corporation to form an optical fiber program-controlled exchange; any one optical fiber output port (H) of the optical switch for large-capacity optical fiber program-controlled exchanges is butt-joined with any one optical fiber input port (≥1) for which the 1000-line MEMS technology of Intel Corporation is applied, wherein the MEMS output port is 1000 lines or 100×0~9 ports are used; the output port of the optical switch for large-capacity optical fiber program-controlled exchanges is butt-joined with the MEMS input port, and two chips and ports are lapped according to the needs of program-controlled exchange.

What is claimed is:

1. An optical switch for large-capacity optical fiber program-controlled exchanges, wherein optical transmission among optical fibers is performed through a reflection of lasers by a lens part of digital micro-minor device (DMD) chips; the lens part of the DMD chips consists of at least twenty single lenses arranged in an one-dimensional array when the optical fibers are single-mode optical fibers or at least twenty lens basic units arranged in an one-dimensional array when the optical fibers are multi-mode optical fibers; the lens basic unit is formed by arranging a number of single lenses in an n×n matrix, wherein 2≤n≤10; the one-dimensional array is arranged in such a direction that the lasers do not interfere with each other after reflection; and an area of the single lenses or that of the lens basic units is not less than the cross-sectional area of a single optical fiber,
    wherein the optical transmission among the optical fibers through the DMD chips is a bi-directional transmission,
    wherein the one-dimensional array is an orderly arrangement in an one-dimensional space.

2. The optical switch for large-capacity optical fiber program-controlled exchanges as claimed in claim 1, wherein a port of the DMD chips is a bi-directional port; the lasers are connected to the DMD chip port through the optical fibers, or chip ports are butt-joined with each other or connected in a mixed way, or randomly connected according to the need of program-controlled exchange control.

3. The optical switch for large-capacity optical fiber program-controlled exchanges as claimed in claim 1, wherein both an address control signal of the single lenses arranged in the one-dimensional array and that of the lens basic units arranged in the one-dimensional array are one-dimensional arrays, wherein the single lenses arranged in the one-dimensional array operate with one address and one semiconductor optical switch, the lens basic units arranged in the one-dimensional array operate with the one address and the one semiconductor optical switch, and the single lenses in the lens basic unit act simultaneously.

4. The optical switch for large-capacity optical fiber program-controlled exchanges as claimed in claim 1, wherein the DMD chips are arranged between an input optical fiber and output optical fibers; the input optical fiber transmits lasers to the lens part of a DMD chip, a DMD chip control circuit controls the lenses to rotate through the hinge of the lenses after sending control signals, and the lenses reflect rays to the corresponding output optical fibers.

5. The optical switch for large-capacity optical fiber program-controlled exchanges as claimed in claim 1, wherein the lens part of the DMD chips can form at least 3 optical reflection angles, wherein an input of each the DMD chip mirror has 1 angle, and an output has at least 3 angles.

6. The optical switch for large-capacity optical fiber program-controlled exchanges as claimed in claim 1, wherein the DMD chips are arranged by an N-level longitudinal extension to form a DMD chip set consisting of at least 2 DMD chips, wherein the input optical fiber transmits the lasers to the first-level DMD chip, the rays are reflected from the first-level DMD chip to the next-level DMD chips corresponding to at least three output angles of the first-level DMD chip by rotating the lens part; in this way, the rays are reflected to the Nth DMD chips and finally reflected to the corresponding output optical fibers;
    or, the DMD chips are arranged by a transverse extension to form a DMD chip set consisting at least 2 DMD chips, wherein the input optical fiber transmits lasers to one of the DMD chips, the rays reflected by the DMD chip and at least one of the at least 3 output angles are reflected to another DMD chip; among the rays reflected by the DMD chip, the rays reflected at least one angle are reflected to another DMD chip, and the rest of the rays are reflected to the corresponding output optical fibers, thus an incident rays are transversely extended.

7. An operating method of the optical switch for large-capacity optical fiber program-controlled exchanges as claimed in claim 1, wherein it includes the following steps:
   (1) the input optical fiber transmits lasers to the lens part of a DMD chip;
   (2) the lens part of the DMD chip rotates and reflects the lasers; when the lens part consists of single lenses arranged in a one-dimensional array, a single lens corresponds to an optical fiber, individual lenses operate with one address and one semiconductor optical switch and act independently,
   when the lens part consists of lens basic units arranged in an one-dimensional array, a lens basic unit corresponds to an optical fiber, individual lens basic units operate with one address and one semiconductor optical switch and the individual single lenses in a lens basic unit act independently;
   (3) rays are reflected into the output optical fibers;
   (4) when there is a fault in the communication line of the output optical fiber in Step (3), feedback signals are sent back, the address and the lens angles of the DMD chips are changed through a control circuit, thus changing output optical fiber ports.

8. The operating method of the optical switch for large-capacity optical fiber program-controlled exchanges as claimed in claim 7, wherein in step (2), the DMD chips are arranged by an N-level longitudinal extension to form a DMD chip set, wherein the input optical fiber transmits lasers to the first-level DMD chip, the rays are reflected from the first-level DMD chip to the next-level DMD chips corresponding to at least three output angels of the first-level DMD chip by rotating the lens part; in this way, the rays are reflected to the Nth DMD chips and finally reflected to the corresponding output optical fibers;
   or, the DMD chips are arranged by transverse extension to form a DMD chip set, wherein the input optical fiber transmits lasers to one of the DMD chips, the rays reflected by the DMD chip and at least one of at least 3 output angles are reflected to another DMD chip; among the rays reflected by the DMD chip, the rays reflected at least one angle are reflected to another DMD chip, and the rest rays are reflected to the corresponding output optical fibers, thus the incident rays are transversely extended;
   or, the DMD chip set formed by an N-level longitudinal extension and the DMD chip set formed by transverse extension are butt-joined to form an optical fiber crossbar program-controlled exchange or router.

9. The operating method of the optical switch for large-capacity optical fiber program-controlled exchanges as claimed in claim 7, wherein in step (2), the input optical fiber transmits lasers to the lens part of a DMD chip, a DMD chip control circuit controls the lenses to rotate through the hinge of the lenses after sending control signals, and the lenses reflect the rays to the corresponding output optical fibers;
   when the communication line described in step (4) is broken, control signals act on multiple DMD chips simultaneously and complete switching to a number of other output optical fibers.

* * * * *